(12) United States Patent
MacDonald et al.

(10) Patent No.: US 7,630,787 B2
(45) Date of Patent: Dec. 8, 2009

(54) SYSTEM FOR INTEGRATING INSERT WITH MOLDED ARTICLE

(75) Inventors: Jeffrey Douglas MacDonald, North York (CA); Alireza Mortazavi, Richmond Hill (CA); Robin Alexander Arnott, Alliston (CA)

(73) Assignee: Husky Injection Molding Systems Ltd, Bolton ON (CA)

( * ) Notice: Subject to any disclaimer, the term of this patent is extended or adjusted under 35 U.S.C. 154(b) by 335 days.

(21) Appl. No.: 11/406,424

(22) Filed: Apr. 19, 2006

(65) Prior Publication Data

US 2007/0250207 A1    Oct. 25, 2007

(51) Int. Cl.
*B29C 45/00* (2006.01)
(52) U.S. Cl. .................. 700/201; 700/112; 700/197
(58) Field of Classification Search ........... 700/112, 700/197, 200, 201, 228; 425/233, 451, 522; 164/136, 262, 271; 264/40.5, 310
See application file for complete search history.

(56) References Cited

U.S. PATENT DOCUMENTS

| | | | | |
|---|---|---|---|---|
| 3,908,748 | A * | 9/1975 | Noisser et al. | 164/329 |
| 3,951,202 | A * | 4/1976 | Anderson | 164/262 |
| 4,248,289 | A * | 2/1981 | Perrella et al. | 164/262 |
| 4,330,257 | A | 5/1982 | Reese et al. | |
| 4,439,123 | A | 3/1984 | Santo et al. | |
| 4,773,844 | A * | 9/1988 | Bartels et al. | 425/435 |
| 4,801,260 | A * | 1/1989 | Oles et al. | 425/451.5 |
| 4,900,493 | A * | 2/1990 | Bartels et al. | 264/71 |
| 5,474,134 | A | 12/1995 | Spoetzl et al. | |
| 5,728,409 | A * | 3/1998 | Schad et al. | 425/130 |
| 5,750,162 | A * | 5/1998 | Schad et al. | 425/533 |
| 5,817,345 | A * | 10/1998 | Koch et al. | 425/130 |

(Continued)

FOREIGN PATENT DOCUMENTS

CA    2241509 C    1/1999

(Continued)

OTHER PUBLICATIONS

Doug Smock, Unique System Uses Press Motion as Punch and Die, Plastics World, Sep. 1992, p. 10.

(Continued)

*Primary Examiner*—Charles R Kasenge
(74) *Attorney, Agent, or Firm*—Husky Intellectual Property Services

(57) ABSTRACT

System comprising mold-moving assembly cooperative with molding station and insert-integration station. Mold-moving assembly operative over cycle, including: first phase: molding station and mold-moving assembly operative to mold molded article, and insert is integrated, in insert-integration station so as to manufacture composite article, and insert-integration station and mold-moving assembly operative to shape insert of composite article into predetermined shaped; second phase: after insert has been shaped, composite article is released and ejected from insert-integration station, and mold-moving assembly is translated away from molding station so that molded article may be removed from molding station; third phase: mold-moving assembly is actuated to move molded article from molding station over to insert-integration station; and fourth phase: insert-integration station receives another insert, and molded article is retained in insert-integration station so that when in first phase is repeated, another insert may become integrated with molded article and then formed with molded article.

18 Claims, 7 Drawing Sheets

U.S. PATENT DOCUMENTS

| | | | |
|---|---|---|---|
| 6,322,738 B1 * | 11/2001 | Sicilia et al. | 264/255 |
| 6,767,200 B2 * | 7/2004 | Sowden et al. | 425/345 |
| 6,837,696 B2 * | 1/2005 | Sowden et al. | 425/345 |
| 6,982,094 B2 * | 1/2006 | Sowden | 425/576 |
| 7,338,697 B2 * | 3/2008 | Abrams | 428/90 |
| 7,364,683 B2 * | 4/2008 | Shakal et al. | 264/237 |
| 2002/0014720 A1 * | 2/2002 | Sicilia et al. | 264/255 |
| 2003/0077409 A1 | 4/2003 | Schnell | |

FOREIGN PATENT DOCUMENTS

| | | |
|---|---|---|
| DE | 19949263 A1 | 4/2001 |
| DE | 10065219 C1 | 7/2002 |
| EP | 0826476 A1 | 3/1998 |
| JP | 2004345328 A | 12/2004 |
| WO | WO 2004/011315 A2 | 2/2004 |
| WO | WO 2004/056610 A2 | 7/2004 |

OTHER PUBLICATIONS

Gram Technology. Retrieved from the internet. All pages, published Feb. 17, 2005, Penton Media, Inc. & Machine Design Magazine.

Mauro, L.J. Retrieved from the internet. All pages, Gardner Publications, Inc.

Kermit Wihitfield, Steeling Plastics, Bayer Corporation. Retrieved from the internet. All pages, Gardner Publications, Inc.

Engineered Fasteners & Components,TRW Automotive Inc. Retrieved from the internet, Pages All, Michigan.

* cited by examiner

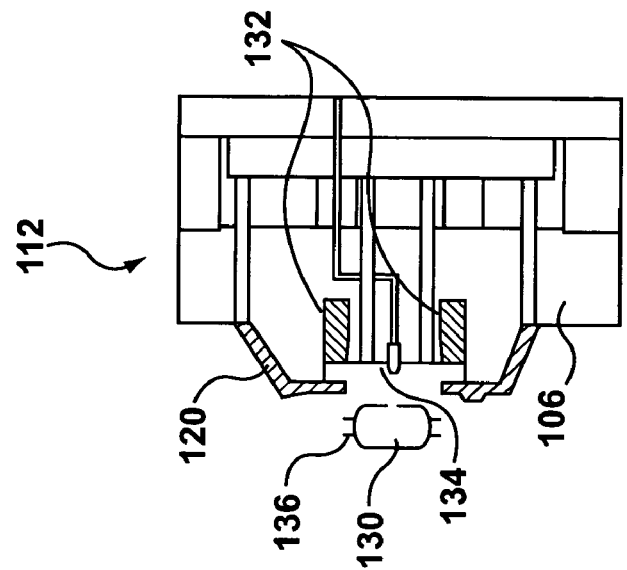
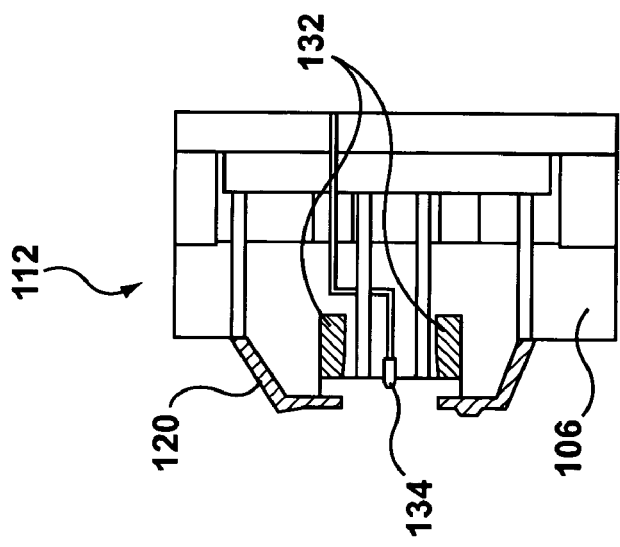
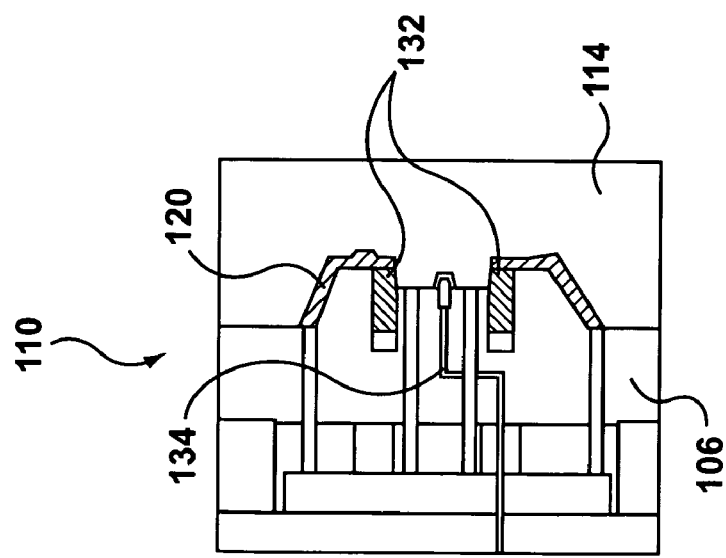

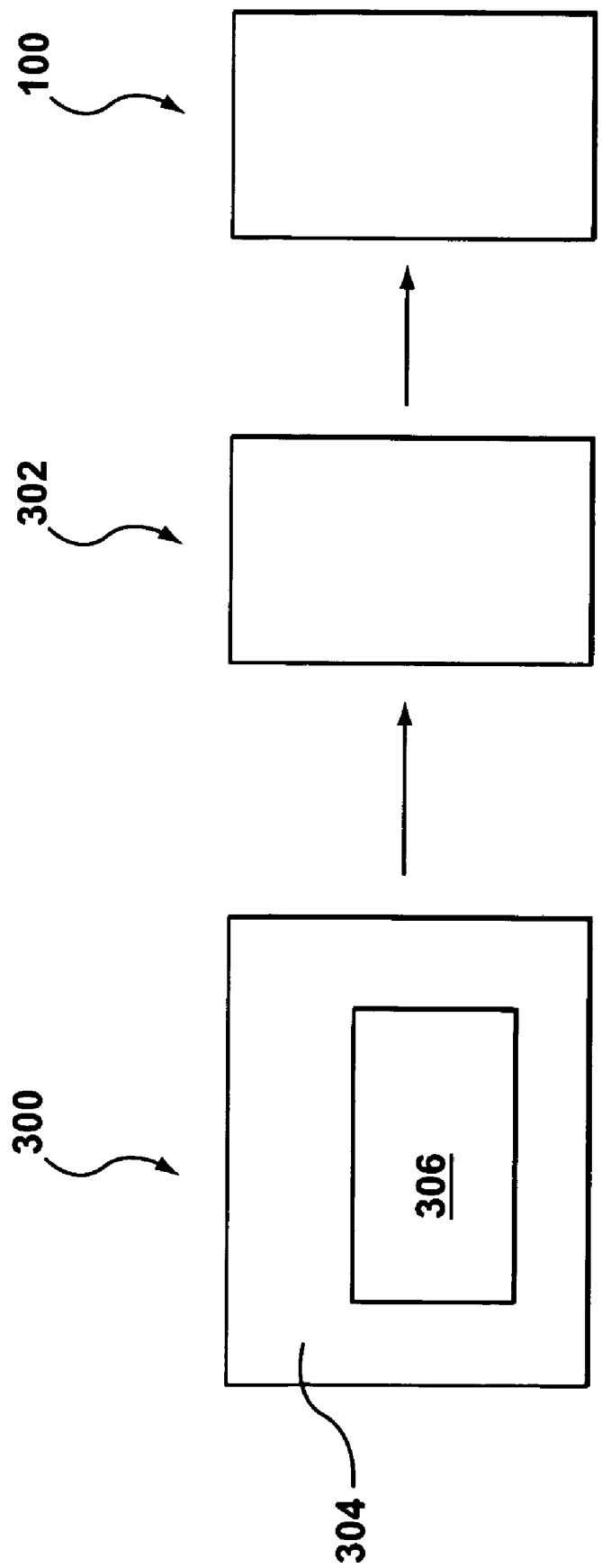

SYSTEM FOR INTEGRATING INSERT WITH MOLDED ARTICLE

TECHNICAL FIELD

The present invention generally relates to, but is not limited to, systems, and more specifically the present invention relates to, but is not limited to, a system for integrating an insert with a molded article.

BACKGROUND

WO Patent 2004/011315 (Inventor: Staargaard et al; Published: 2004 Feb. 5; Assignee: General Electric Company, USA), WO Patent 2004/056610 (Inventor: Staargaard; Published: 2004 Jul. 8; Assignee: General Electric Company, USA) and US Patent Application 2003/0077409 (Inventor: Schnell; Published: 2003 Apr. 24) all appear to disclose a process and system for inserting a hydro-formed metal insert into a mold of a molding machine, and then partially encapsulating or overmolding the formed insert with a molding material (such as a plastic resin). This approach includes using different types of machines, one type for forming and another type for molding.

EP Patent 826,476 (Inventor: Buchholz; Published: 1998 Mar. 4; Assignee: Tecumseh Products Company, USA) appears to disclose loading and forming an insert (that is, a tube) in a single mold of a molding system, and then encapsulating or overmolding the insert with a molding material (such as a plastic resin). This approach includes performing the forming operation and the overmolding operation in the single mold.

An article titled *Secondary Operations: Unique System Uses Press Motion As Punch and Die* (published by *Plastics World* in September 1992, page 10) discloses a molding system having a mold. With the mold opened, a press operator loads a metal insert (that is a metal buss bar) into the mold. As a press closes and clamps, a punch and die mechanism pierces a slug in the insert, and then a nylon-based molding material is injected into the mold to overmold the insert. The forming operation and the overmolding operation are performed sequentially in the same mold.

A document (dated October 1989, titled *ALPHA—Multiprocessing Technology* and published by Krauss Maffei of Germany), discloses the ALPHA molding system that appears to be an integration of several types of molding systems (such as, for example, a compression molding system, an injection molding system and/or a gas-pressure molding system). This arrangement appears to combine different molding materials into a molded article using different processes.

SUMMARY

According to a first aspect of the present invention, there is provided a system, comprising: a mold-moving assembly being cooperative with a molding station and an insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to a second aspect of the present invention, there is provided a system, comprising: a mold half of a set of mold halves configured to cooperate with a mold-moving assembly, the mold-moving assembly being cooperative with a molding station and an insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to a third aspect of the present invention, there is provided a system, comprising: an insert-integration station configured to cooperate with a mold-moving assembly, the mold-moving assembly being cooperative with a molding station and the insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to a fourth aspect of the present invention, there is provided a system, comprising: a mold half of a group of mold halves configured to cooperate with an insert-integration station, the insert-integration station configured to cooperate with a mold-moving assembly, the mold-moving assembly being cooperative with a molding station and the insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to a fifth aspect of the present invention, there is provided a system, comprising: a molding station configured to cooperate with a mold-moving assembly, the mold-moving assembly being cooperative with the molding station and an insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to a sixth aspect of the present invention, there is provided a system, comprising: a mold half of a collection of mold halves configured to cooperate with a molding station, the molding station configured to cooperate with a mold-moving assembly, the mold-moving assembly being cooperative with an insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to a seventh aspect of the present invention, there is provided a method, comprising: configuring a mold-moving assembly to: cooperate with a molding station and an insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

According to an eighth aspect of the present invention, there is provided an article of manufacture for directing a data processing system to control a molding system operatively connectable to the data processing system, the article of manufacture comprising: a data processing system usable medium embodying one or more instructions executable by the data processing system, the data processing system usable medium being a memory device having the one or more instructions and the one or more instructions including: instructions for directing the data processing system to direct a mold-moving assembly to: cooperate with a molding station and an insert-integration station, the molding station and the mold-moving assembly being cooperative to mold a molded article, the mold-moving assembly being configured to move the molded article from the molding station over to the insert-integration station, the insert-integration station being configured to integrate an insert to the molded article to manufacture a composite article, the composite article being the insert integrated with the molded article, and the insert-integration station being cooperative with the mold-moving assembly to form, at least in part, the insert of the composite article, and once the insert has been formed, the composite article is ejected from the insert-integration station.

A technical effect is reduction in complexity in a system for molding articles having an insert.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which:

FIG. 2A is a side view of mold halves that are placed in a position to mold a molded article in a molding station of the system of FIG. 1A;

FIGS. 2B, 2C and 2D are side elevation views of a mold half that is rotated and placed in an insert-integration station of the system of FIG. 1A;

FIG. 3 is a block schematic diagram of an article of manufacture according to a second exemplary embodiment, the article for directing a data processing system to control the system of FIG. 1A.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

FIGS. 1A to 1D are side-elevation views of a system 100 according to the first exemplary embodiment. The elements or components of the system 100 may be supplied by different vendors in different combinations and permutations or may be supplied by a single vendor.

Figure 1A:
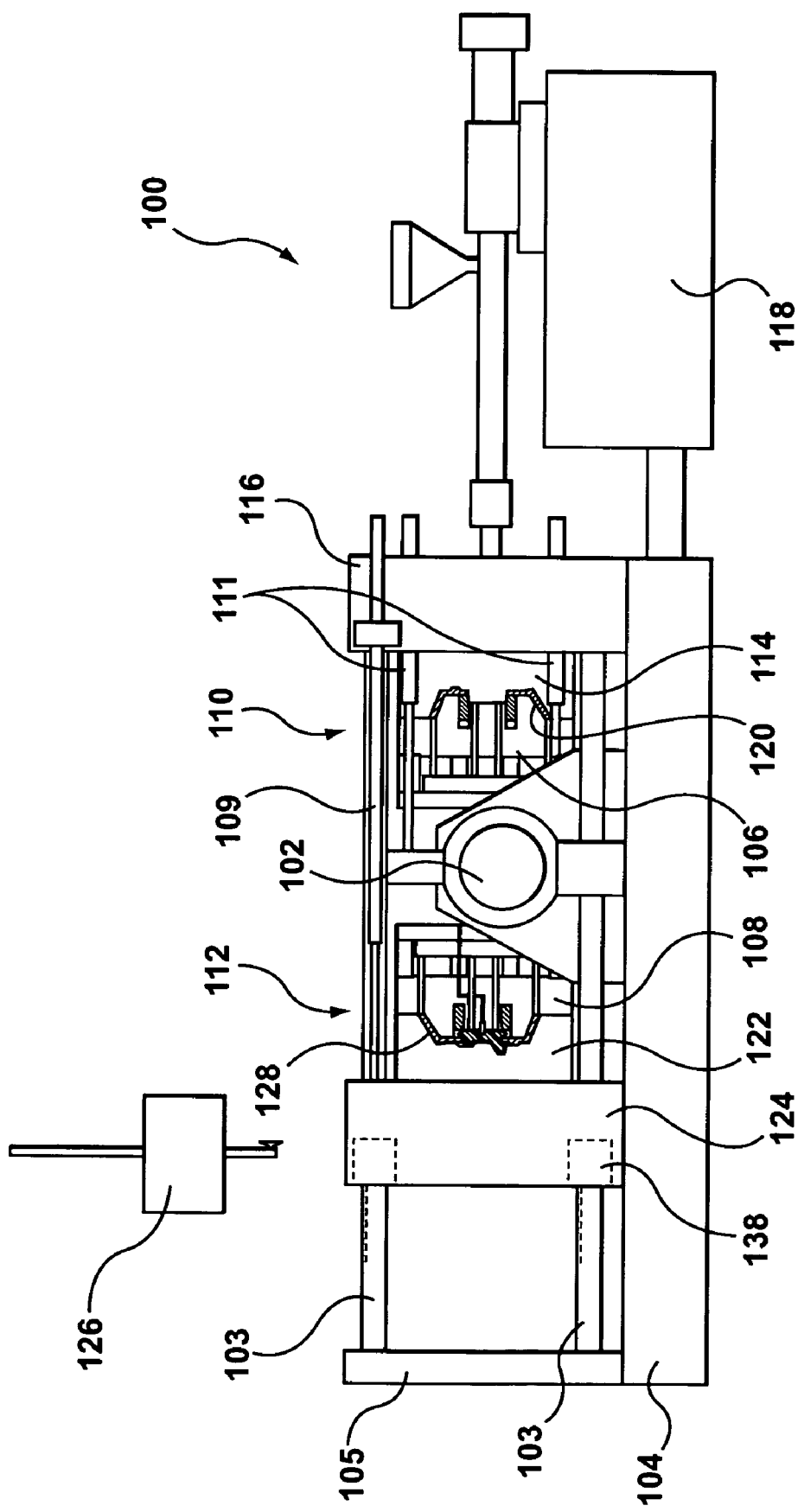
FIGS. 1A to 1D are side-elevation views of a system according to a first exemplary embodiment.

FIG. 1A depicts a first phase of a cycle of the system 100. Briefly, the system 100 uses a mold-moving assembly 102 that cooperates with a molding station 110 and an insert-integration station 112. The molding station 110 and the assembly 102 cooperate to mold a molded article. The mold-moving assembly 102 moves the molded article from the molding station 110 over to the insert-integration station 112. At the insert-integration station 112, an insert is integrated to the molded article to manufacture a composite article. The insert-integration station 112 in cooperation with the mold-moving assembly 102 forms the insert of the composite article into a predetermined shape or condition. Once the insert has been formed, the composite article is ejected from the insert-integration station 112. A technical effect is reduction in complexity in a system for molding articles having an insert.

For example, the insert-integration station 112 may include insert-forming operations, such as stamping, punching, bending and/or hydroforming, etc.

Examples of the types of composite articles than may be manufactured by the system 100 are: cooling fans used in a vehicle radiator, a vehicle bumper assembly, a vehicle-running board, etc, or non-vehicle applications.

According to a variant, the operation of the molding station 110 and of the insert-integration station 112 overlap one another at least in part so that a reduction in cycle time is achieved. According to another variant, operation of the molding station 110 and of the insert-integration station 112 occur simultaneously or near simultaneously (that is, overlap of the operations occur concurrently) for best possible reduction in cycle time.

Attached to the mold-moving assembly 102 is a set of mold halves (106, 108). The set of mold halves (106, 108) includes the mold half 106 and the mold half 108. Actuators 111 are used to stroke or slide the mold-moving assembly 102 along a base 104 toward and away from the molding station 110. Another pair of actuators similar to the actuators 111 is used but they are hidden in this view of the system 100. The mold-moving assembly 102 includes an actuator (not depicted) that is used to rotate the mold halves 106, 108 one hundred and eighty degrees between the stations 110, 112.

The molding station 110 uses a group of mold halves (106, 108, 114) to mold articles by alternately using the combination of mold halves (106, 114) or the combination of mold halves (108, 114). The group of mold halves (106, 108, 114) shares at least one mold half that is common with the set of mold halves (106, 108). The mold half 114 is attached to a stationary platen 116. An injection unit 118 is used to prepare and deliver a molding material to the molding station 110. The molding material may be a plastic-based resin, a plastic-based resin in combination with a reinforcement (such as fibers), a metallic alloy (such as magnesium) or a metallic alloy in combination with a reinforcement (such as a ceramic powder).

The actuators 111 are actuated to stroke the mold-moving assembly 102 toward the stationary platen 116 so that the mold halves 106, 114 are closed against each other. Then the mold halves 106, 114 are clamped up. The process for clamping up mold halves is explained below. Then the injection unit 118 delivers the molding material into a mold cavity defined by the mold halves 106, 114 (that are closed and clamped against each other) to mold a molded article 120. The article 120 is retained by the mold half 106 once the mold halves 106, 114 are made to break apart from each other. The process for breaking apart the mold halves will be explained below. Once the mold halves 106, 114 are broken apart, the actuators 111 stroke the mold moving assembly 102 away from the stationary platen 116 so that the mold halves 106, 114 become spaced apart from each other. The mold-moving assembly 102 will then be actuated to rotate the mold half 106 away from the molding station 110 and over to the insert-integration station 112, and will then be actuated to rotate the mold half 108 away from the insert-integration station 112 and over to the molding station 110.

An insert-delivery assembly 126 will be actuated to deliver an insert to the insert-integration station 112, and then be actuated to position the insert proximate to the molded article that is releasably retained by the mold half 108. The mold half 108 will then be actuated to retain the insert proximate to the molded article. Preferably, the insert includes flanges that engage the molded article retained by the mold half 108. The flanges are not depicted in FIG. 1A but they are depicted in FIG. 2C. It will be appreciated that other types of features on the insert may be used in place of the flange, such as a rib extending from the insert, a groove formed by the insert, etc. Once the insert is positioned proximate to the molded article, the insert will be formed in the insert-integration station 112 so that a composite article 128 is manufactured (as explained below), and the article 128 will include the insert and the molded article.

The insert-integration station 112 uses a collection of mold halves (106, 108, 122) to form the insert of the composite article 128 that is retained by the mold half 108. The station 112 alternately uses the combination of mold halves (106, 122) and the combination of mold halves (108, 122) to form the insert of the composite article 128. The collection of mold halves (106, 108, 122) shares at least one mold half that is common with the set of mold halves (106, 108). A mold half 122 is attached to a movable platen 124. An actuator 109 is used to stroke or to linearly translate the movable platen 124 along the base 104 toward and away from the mold-moving assembly 102 so that the mold halves 108, 122 may be opened and closed. Another actuator similar to the actuator 109 is also used but it is hidden in this view of the system 100. Tie bars 103 extend from the stationary platen 116, through the movable platen 124 and over to a tie-bar support assembly 105. Another pair of tie bars is used but they are hidden behind the tie bars 103 in this view. The tie-bar support assembly 105 is used to prevent the tie bars 103 from sagging. It will be appreciated that the tie-bar-support assembly 105 is optional, and that the tie bars 103 may extend and sag a little and not require support. Once the actuator 109 strokes the movable platen 124 toward the mold-moving assembly 102, the mold halves 108, 122 become closed against one another. Then a clamping mechanism 138 is actuated to apply a clamping force via the tie bars 103 to clamp the mold halves 108, 122 together. Now the insert (that is integrated to the molded article) may be formed. Preferably, the insert includes a metallic component and the process for forming the insert is a hydro-forming process. Alternatively, the process of closing and/or clamping the mold halves 108, 122 relative to each other causes the insert to be formed.

In the station 112, forming of the insert may occur in several ways: (i) the mold halves are closed and then the insert is formed; (ii) the insert is formed while the mold halves are being made to close against each other; (iii) the insert is formed prior to the mold halves being made to close; (iv) the mold halves are used in the process of forming the insert; and/or (v) the mold halves are not used in the process of forming the insert.

The clamping mechanism 138 is located in the movable platen 124. The clamping mechanism 138 is used to apply a clamping force to the tie bars 103 so that the mold halves 106, 114, and the mold halves 108, 122 may be clamped up once they are closed together relative to each other. The clamping mechanism 138 is also used to apply a mold-break force to break apart mold halves that were formerly clamped together. The clamping mechanism 138 includes, for example, a pineapple-type clamping mechanism as known in the art. Other types of clamps (non-pineapple type) may be used in the system 100.

After the insert has been integrated to the molded article in the station 112, the actuators 111 are actuated to move the mold-moving assembly 102 toward the stationary platen 116 so that the mold halves 106, 114 are closed together, and the actuator 109 is actuated to move the platen 124 toward the mold-moving assembly 102 so that the mold halves 108, 122 are closed together. Once the mold halves are closed together, the clamping mechanism 138 applies a clamping force to the tie bars 103 which act to clamp up the mold halves. Once clamped up, the mold halves 106, 114 are used to mold the molded article 120 (as previously described), and the mold halves 108, 122 are used to form or to shape the insert attached to a molded article to manufacture the composite article 128. Once the composite article 128 is manufactured and the molded article 120 is molded, the clamping mechanism 138 is actuated to remove the clamping force and is then actuated to apply a mold break force that breaks mold halves apart from each other. Then the actuator 109 is actuated to move the platen 124 away from the mold-moving assembly 102, while the actuators 111 are actuated to move the mold-moving assembly 102 away from the platen 116. In this way the mold halves 106, 114 are separated from each other (while the mold half 106 releasably retains the molded article 120), and the mold halves 108, 122 are separated from each other (while the mold half 108 releasably retains the article 128). Once mold halves are separated, the composite article 128 is ejected (or released) from the mold half 108. Then the mold-moving assembly 102 is actuated to rotate the mold halves 106, 108 one hundred and eighty degrees so that the mold half 108 then faces the mold half 114 and the mold half 106 then faces the mold half 122, and in effect the molded article 120 is moved from the station 110 over to the station 112.

Figure 1B:
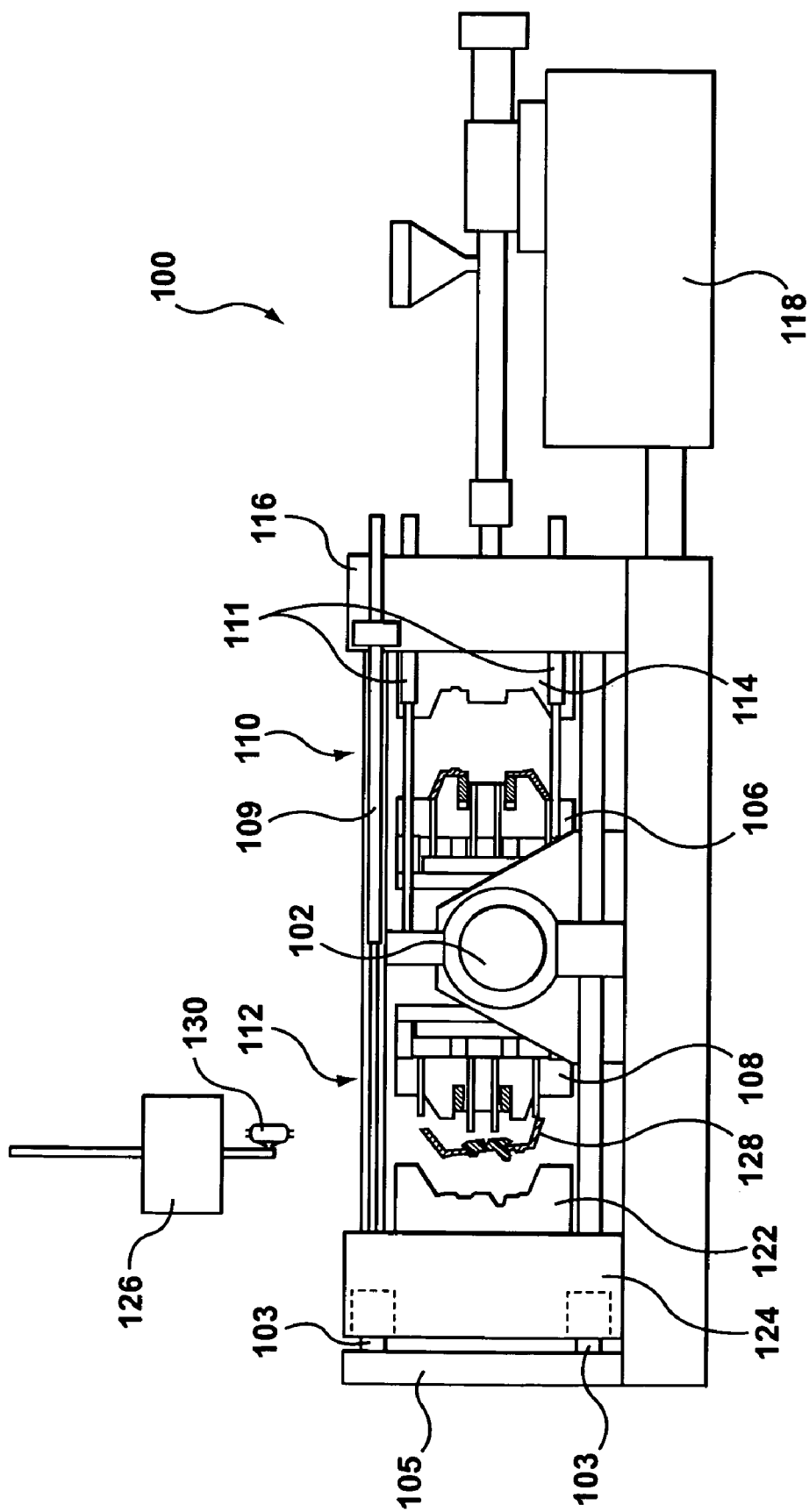

FIG. 1B depicts a second phase of the cycle of the system 100. The actuator 109 actuates to translate the movable platen 124 away from the mold-moving assembly 102 so that the mold half 122 becomes spaced apart from the mold half 108 and the mold half 108 actuatably releases the composite article 128 from the insert-integration station 112. The insert-delivery assembly 126 is ready to supply another insert 130 to the insert-integration station 112. The actuator 111 is actuated to translate the mold-moving assembly 102 away from the mold half 114 so that the mold half 106 may then become spaced apart from the mold half 114. The mold half 106 releasably retains the molded article 120.

Figure 1C:
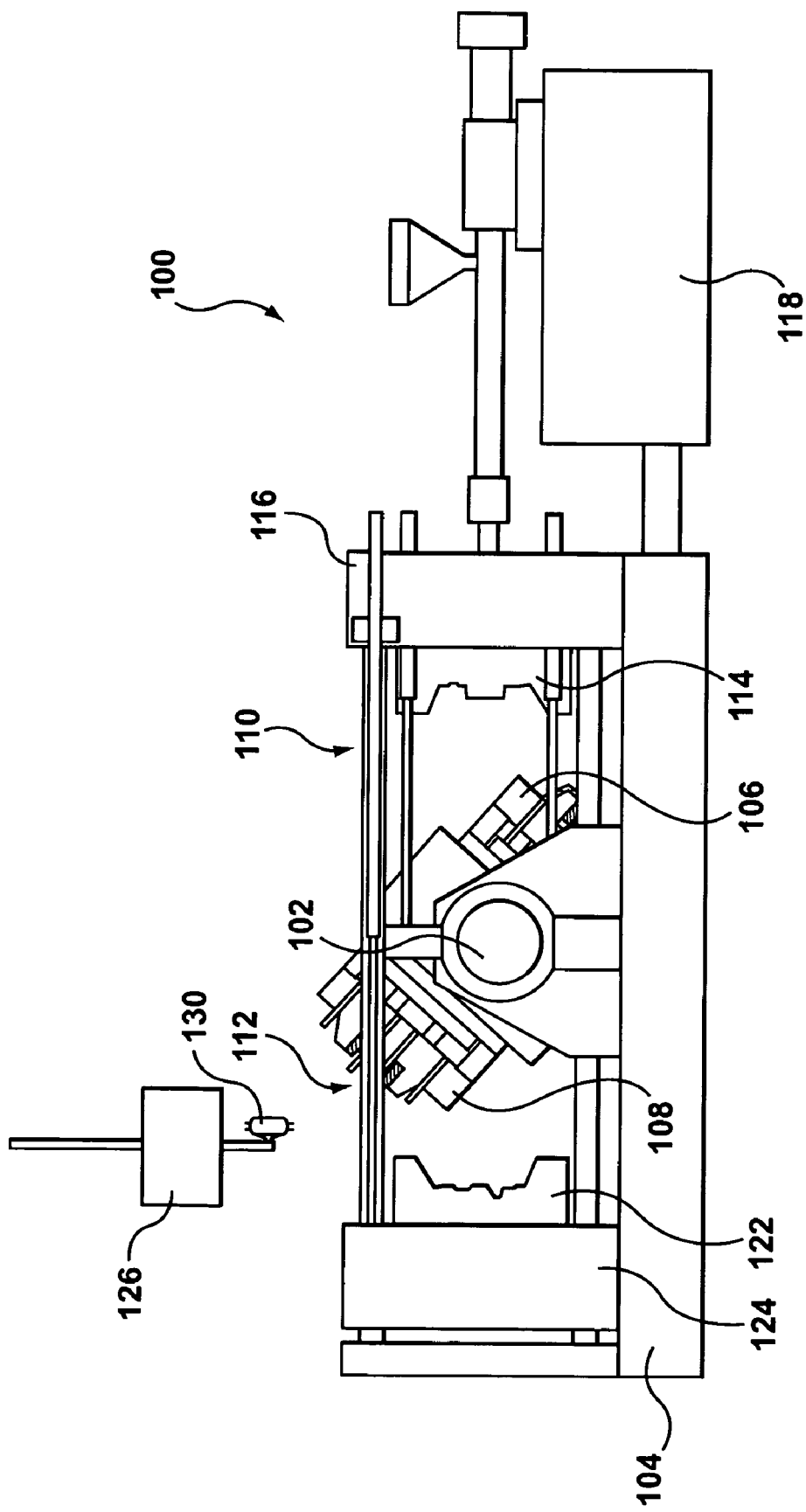

FIG. 1C depicts a third phase of the cycle of the system 100. The mold-moving assembly 102 is actuated to rotate the mold half 106 from the molding station 110 over to the insert-integration station 112 so that the mold half 106 may become positioned to cooperate with the mold half 122. The mold-moving assembly 102 also rotates the mold half 108 from the insert-integration station 112 over to the molding station 110 so that the mold half 108 may become positioned to cooperate with the mold half 114.

Figure 1D:
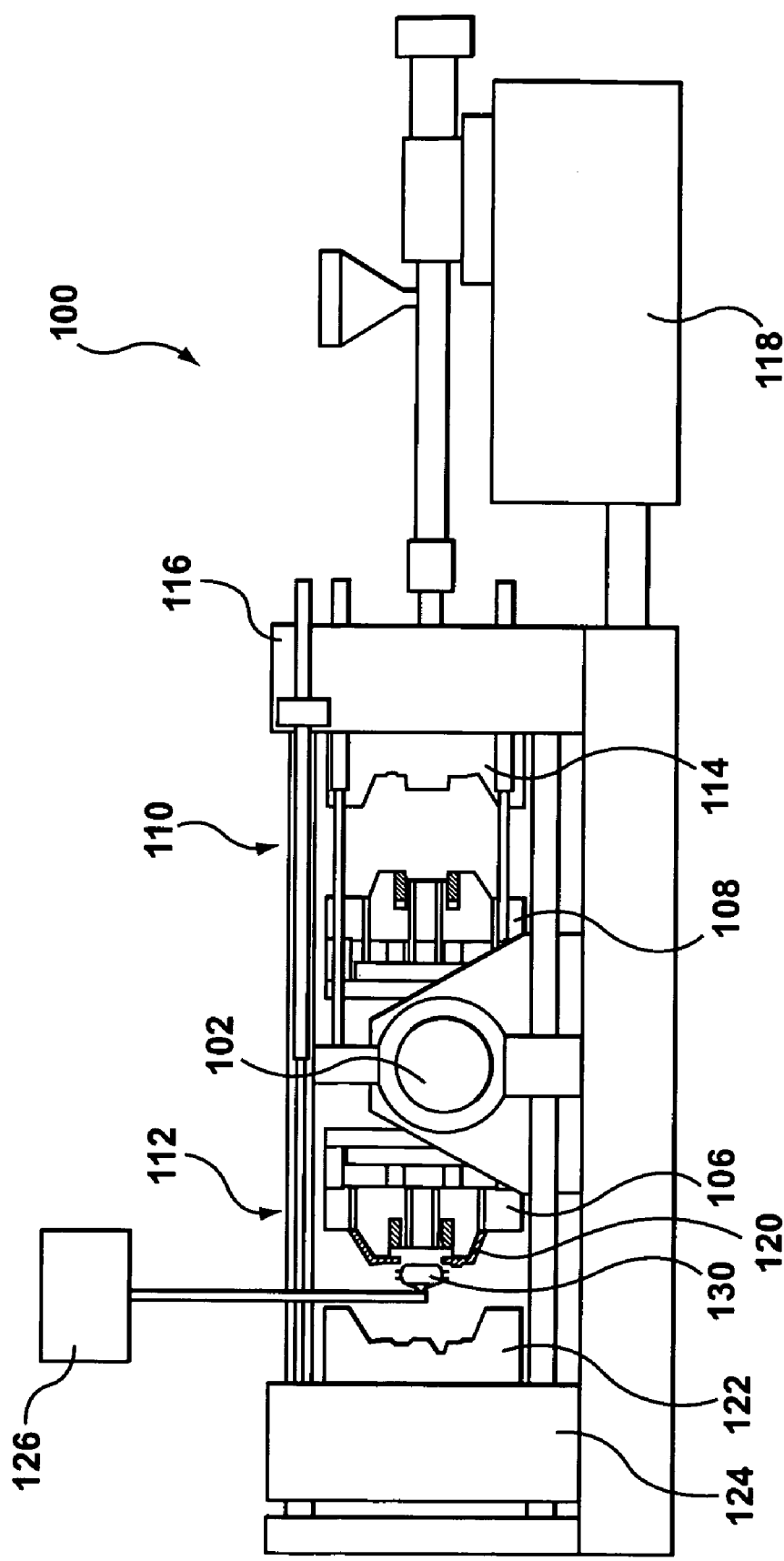

FIG. 1D depicts a fourth phase of the cycle of the system 100. The mold half 108 is now positioned to face the mold half 114 in the molding station 110. A new molded article is molded once the mold halves 108, 114 are actuated to become closed and clamped against each other. The mold half 106, which is shown retaining the molded article 120, is now positioned to face the mold half 122 in the insert-integration station 112 so that the insert 130 may become integrated with the molded article 120. The insert-delivery assembly 126 places the insert 130 within the insert-integration station 112 and then engages the insert 130 to the molded article 120. A new composite article is manufactured once the mold halves 106, 122 are actuated to become closed and clamped against each other so that the insert 130 (that is integrated to the article 120) may be formed. Integration of an insert with a molded article is explained below with reference to FIGS. 2A to 2F.

FIG. 2A is a side view of the mold halves 106, 114 that are closed against each other and clamped up so that the mold halves define the molding cavity. The molding material is injected into the mold cavity to mold the molded article 120 in the molding station 110 of the system 100. The description of the mold half 106 is equally applicable to the mold half 108. Preferably, the molded article 120 is molded to have a passageway that passes through the molded article 120.

An insert (depicted in FIGS. 2C and 2D) will be made to enter the passageway of the molded article 120 at least in part and engage with the molded article 120. Preferably the insert attaches to a peripheral edge along the passageway of the molded article 120.

The mold half 106 includes mold inserts 132 that are actuatably slidable within the mold half 106. In a molding position, the mold inserts 132 will be actuated forwardly to form the cavity that will be used to mold or shape the molded article 120. After the molded article 120 is molded, the mold halves 106 and 114 will be separated from each other. Once the mold half 106 is moved into the insert-integration station 112, the mold inserts 132 will be translated away from the molded article 120 so that the insert 130 may be integrated with the molded article 120. Preferably, the mold half 106 includes a hydro-forming fluid line 134 that will be used to transport a hydro-forming fluid into the hollow body of insert 130 so that the hydro-forming fluid may be used to hydro-form the insert (the insert includes a hollow body for example). According to a variant, the flange of the insert may be made during a forming process initiated in the station 112.

Figure 2D:
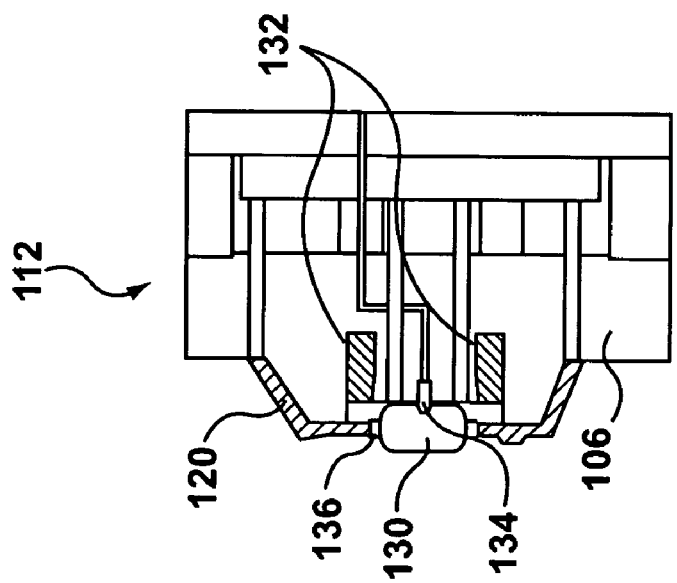

FIGS. 2B, 2C and 2D are side elevation views of the mold half 106 that is rotated and placed in the insert-integration station 112 of the system 100 of FIG. 1A.

FIG. 2B depicts the mold half 106 as a core half. The mold half 106 releasably retains the mold article 120 (by mechanisms not depicted). The mold inserts 132 have been retracted to expose protruding flanges of the molded article 120. Other features are contemplated, such as lip, recess, clip, fastener, etc.

FIG. 2C depicts the insert 130 delivered by the insert-delivery assembly 126 (not depicted in FIG. 2C) to a position that is proximate to the article 120 retained by the mold half 106. Preferably, the insert 130 includes a hollow metallic body. The insert 130 includes flanges 136 that are used to engage the flanges of the molded article 120. The insert 130 includes an orifice that is to be connected to the hydro-forming fluid line 134.

FIG. 2D depicts the flanges of the insert 130 positioned proximate to the flange of the molded article 120. The mold half 106 includes a gripping mechanism (not depicted) for gripping and retaining the insert 130 proximate to the article 120. The insert-delivery assembly 126 (not depicted in FIG. 2D) positioned the insert 130 proximate to the molded article 120, and then the gripping mechanism of the mold half 106 was actuated to retain the insert 130 proximate to the article 120. A vacuum line (not depicted) may be used to releasably retain the insert 130 and/or the article 120 against the mold half 106. Alternatively, an electromagnet (not depicted) may be used to retain and hold the insert 130 against the mold half 106. Alternatively, a mechanical gripper (not depicted) may be used to grab and to releasably retain the insert 130 and/or the article 120 against the mold half 106.

Figure 2E:
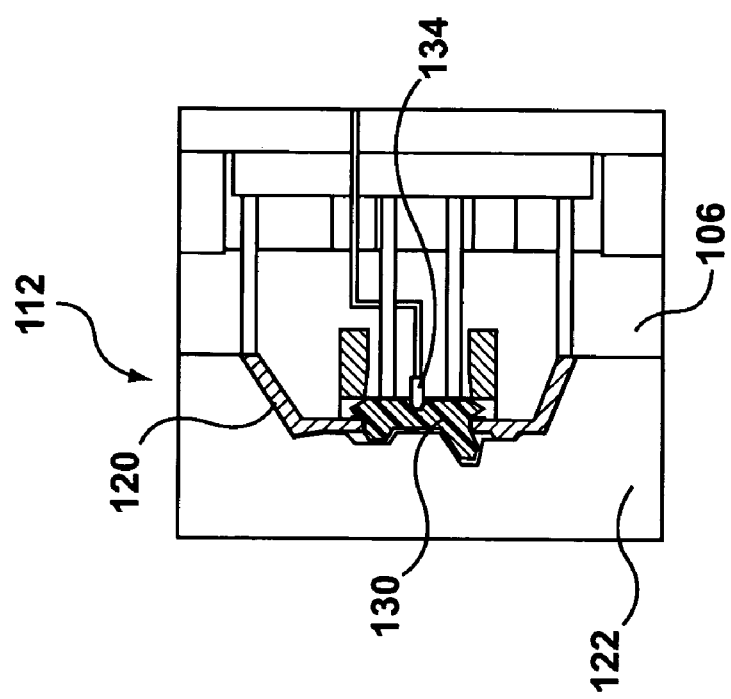
FIG. 2E is a side view of mold halves that are placed in a position to form an insert in an insert-integration station of the system of FIG. 1A.

FIG. 2E is a side view of the mold halves 106, 122 that are placed in a position to form the insert 130 in the insert-integration station 112. The mold halves 106, 122 are closed and clamped against each other. A pressurized hydro-forming fluid is introduced into an interior cavity of the insert 130 (via the fluid line 134 that now fluidly communicates with the interior of the insert 130), and in response the insert 130 becomes deformed to conform to the mold surfaces that surround the insert 130. Alternatively, if the pressure of the hydro-forming fluid is controlled carefully, the insert 130 is deformed sufficiently to engage the flanges of the molded article 120 and to conform to at least some of the mold surfaces while the insert 130 remains spaced apart from other mold surfaces at least in part. The degree of control exercised depends on the desired shape of the composite article 128. In some configurations a cross sectional strength of the plastic portion in the flange area may not be strong enough to resist forces applied by deformation of a metallic insert and the flange may collapse, whereas in other configurations the flange may be strong enough to resist modest deformation forces sufficiently enough to be able to form a mechanical engagement with the flanges on the insert 130 as the insert 130 deforms during the hydro-forming process.

Figure 2F:
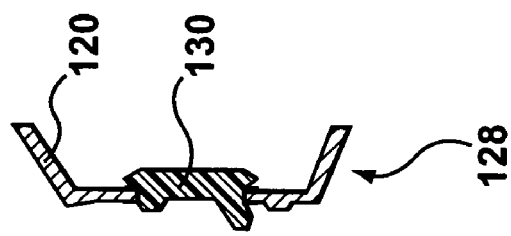
FIG. 2F is a side elevation view of an composite article manufactured by the system of FIG. 1A.

FIG. 2F is a side elevation view of the composite article 128 manufactured by the system 100. The composite article includes the molded article 120 and the formed insert 130.

According to a variant, the mold-moving assembly 102 translates mold halves 106, 108 along a vertically-aligned axis. According to another variant, the mold-moving assembly 102 translates the mold halves 106, 108 along a horizontally-aligned axis.

According to a variant, the mold half 106 is a core-type mold. According to another variant, the mold half 106 is a cavity-type mold. According to a variant, the mold half 108 is a core-type mold. According to another variant, the mold half 108 is a cavity-type mold.

FIG. 3 is a block schematic diagram of an article of manufacture 300 for directing a data processing system 302 to control the system 100 of FIG. 1A. The system 100 is operatively connectable to the data processing system 302. The article of manufacture 300 includes a data processing system usable medium 304 embodying one or more instructions 306 executable by the data processing system 302. The one or more instructions 306 includes instructions for directing the data processing system to direct a mold-moving assembly 102 to move a molded article 120 between a molding station 110 and an insert-integration station 112. The article of manufacture 300 may be a magnetic disk, an optical disk, a hard drive or RAM (Random Access Memory). The article of manufacture 300 may also be a signal that carries the one or more instructions over a network, such as the Internet, to the data processing system 302.

The one or more instructions 306 also includes, but is not limited to, the following in no particular order:

instructions for directing the data processing system to direct the insert-integration station 112 to integrate an insert 130 at least in part with the molded article 120, and instructions for directing the data processing system to direct the molding station 110 to mold the molded article 120;

instructions for directing the data processing system to direct the insert-integration station 112 to integrate an insert 130 at least in part with the molded article 120, the insert-integration station 112 configured to cooperate with the set of mold halves 106, 108;

instructions for directing the data processing system to direct the mold-moving assembly 102 to move a set of mold halves 106, 108 between the insert-integration station 112 and the molding station 110;

instructions for directing the data processing system to direct the insert-integration station 112 to integrate the insert 130 at least in part with the molded article 120, the insert-integration station 112 including a group of mold halves 106, 108, 114 configured to cooperate with the set of mold halves 106, 108;

instructions for directing the data processing system to direct the molding station 110 to mold the molded article 120, the molding station 110 configured to cooperate with the set of mold halves 106, 108;

instructions for directing the data processing system to direct the molding station 110 to mold the molded article 120, the molding station 110 configured to include a collection of mold halves 106, 108, 122 that are configured to cooperate with the set of mold halves 106, 108;

instructions for directing the data processing system to direct the mold-moving assembly 102 to rotate a set of mold halves 106, 108 between the insert-integration station 112 and the molding station 110;

instructions for directing the data processing system to direct the mold-moving assembly 102 to linearly translate a set of mold halves 106, 108 between the insert-integration station 112 and the molding station 110;

instructions for directing the data processing system to direct a retaining structure to releasably retain the insert 130, the retaining structure configured to cooperate with the set of mold halves 106, 108; and instructions for directing the data processing system to direct the insert-integration station 112 to hydro-form a metallic component of the insert 130 at least in part.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A system, comprising:
a mold-moving assembly that cooperates with a molding station and an insert-integration station, the mold-moving assembly is configured to support a set of mold halves, the mold-moving assembly is configured to stroke toward and away from the molding station, and the mold-moving assembly is configured to rotate the set of mold halves between the molding station and the insert-integration station, and
the mold-moving assembly being operative over a cycle, the cycle including:
a first phase, during which: (i) the molding station and the mold-moving assembly are operative to mold a molded article, and (ii) an insert is integrated, in the insert-integration station, with the molded article being previously molded in the molding station, so as to manufacture a composite article, and the insert-integration station and the mold-moving assembly are operative to shape the insert of the composite article into a predetermined shape;
a second phase, during which: (a) after the insert has been shaped, the composite article is released and ejected from the insert-integration station, and (b) the mold-moving assembly is translated away from the molding station so that the molded article may be removed from the molding station;
a third phase, during which the mold-moving assembly is actuated to move the molded article from the molding station over to the insert-integration station; and
a fourth phase, during which: (I) the insert-integration station receives another insert, and (II) the molded article is retained in the insert-integration station so that when in the first phase is repeated, the another insert may become integrated with the molded article and then formed with the molded article.

2. The system of claim 1, wherein operation of the molding station and operation of the insert-integration station overlap one another at least in part to reduce cycle time.

3. The system of claim 1, wherein the insert-integration station is configured to integrate the insert at least in part with the molded article, and wherein the molding station is configured to mold the molded article.

4. The system of claim 1, wherein the mold-moving assembly is configured to move the set of mold halves between the insert-integration station and the molding station, and wherein the set of mold halves is configured to cooperate with the insert-integration station to integrate the insert at least in part with the molded article.

5. The system of claim 1, wherein the mold-moving assembly is configured to move the set of mold halves between the insert-integration station and the molding station, and wherein the insert-integration station includes a group of mold halves configured to cooperate with the set of mold halves to integrate the insert at least in part with the molded article.

6. The system of claim 1, wherein the mold-moving assembly is configured to move the set of mold halves between the insert-integration station and the molding station, and wherein the set of mold halves is configured to cooperate with the molding station to mold the molded article.

7. The system of claim 1, wherein the mold-moving assembly is configured to move the set of mold halves between the insert-integration station and the molding station, and wherein the molding station includes a collection of mold halves configured to cooperate with the set of mold halves to mold the molded article.

8. The system of claim 1, wherein the mold-moving assembly is configured to move the set of mold halves between the insert-integration station to the molding station, and wherein the set of mold halves includes a retaining structure configured to releasably retain the insert.

9. The system of claim 1, wherein the insert includes a metallic component, and wherein the insert-integration station is configured to hydro-form the metallic component of the insert at least in part.

10. A method, comprising:
cooperating a mold-moving assembly with a molding station and an insert-integration station,
using the mold-moving assembly to support a set of mold halves,
stroking the mold-moving assembly toward and away from the molding station,
using the mold-moving assembly to rotate the set of mold halves between the molding station and the insert-integration station, and
operating the mold-moving assembly over a cycle, the cycle including:
a first phase, during which: (i) the molding station and the mold-moving assembly are operative to mold a molded article, and (ii) an insert is integrated, in the insert-integration station, with the molded article being previously molded in the molding station, so as to manufacture a composite article, and the insert-integration station and the mold-moving assembly are operative to shape the insert of the composite article into a predetermined shape;
a second phase, during which: (a) after the insert has been shaped, the composite article is released and ejected from the insert-integration station, and (b) the mold-moving assembly is translated away from the molding station so that the molded article may be removed from the molding station;
a third phase, during which the mold-moving assembly is actuated to move the molded article from the molding station over to the insert-integration station; and
a fourth phase, during which: (I) the insert-integration station receives another insert, and (II) the molded article is retained in the insert-integration station so that when in the first phase is repeated, the another insert may become integrated with the molded article and then formed with the molded article.

11. The method of claim 10, further comprising:
configuring operation of the molding station and operation of the insert-integration station overlap one another at least in part to reduce cycle time.

12. The method of claim 10, further comprising:
configuring the insert-integration station to integrate the insert at least in part with the molded article; and
configuring the molding station to mold the molded article.

13. The method of claim 10, further comprising:
configuring the mold-moving assembly to move the set of mold halves between the insert-integration station and the molding station; and
configuring the set of mold halves to cooperate with the insert-integration station to integrate the insert at least in part with the molded article.

14. The method of claim 10, further comprising:
configuring the mold-moving assembly to move the set of mold halves between the insert-integration station and the molding station; and
configuring the insert-integration station to include a group of mold halves configured to cooperate with the set of mold halves to integrate the insert at least in part with the molded article.

15. The method of claim 10, further comprising:
configuring the mold-moving assembly to move the set of mold halves between the insert-integration station and the molding station; and
configuring the set of mold halves to cooperate with the molding station to mold the molded article.

16. The method of claim 10, further comprising:
configuring the mold-moving assembly to move the set of mold halves between the insert-integration station and the molding station; and
configuring the molding station to include a collection of mold halves configured to cooperate with the set of mold halves to mold the molded article.

17. The method of claim 10, further comprising:
configuring the mold-moving assembly to move the set of mold halves between the insert-integration station to the molding station; and
configuring the set of mold halves to include a retaining structure configured to releasably retain the insert.

18. The method of claim 10, further comprising:
configuring the insert to include a metallic component; and
configuring the insert-integration station to hydro-form the metallic component of the insert at least in part.

* * * * *